UNITED STATES PATENT OFFICE.

CHARLES B. HARRIS, OF NEW YORK, N. Y., ASSIGNOR TO S. I. ATWATER, TRUSTEE, OF NEW YORK, N. Y.

ARTIFICIAL FUEL.

SPECIFICATION forming part of Letters Patent No. 709,851, dated September 23, 1902.

Application filed January 7, 1902. Serial No. 88,788. (No specimens.)

*To all whom it may concern:*

Be it known that I, CHARLES B. HARRIS, a citizen of the United States, and a resident of the borough of Manhattan, in the county of New York and State of New York, have invented certain new and useful Improvements in Artificial Fuel, of which the following is a specification.

This invention relates to artificial fuel; and its object is to provide a new composition of matter which when mixed with coal-dust and the like produces artificial fuel which will be hard, compact, waterproof, and will not disintegrate when burning.

I am aware that artificial fuel has been made in Europe with binders of coal-tar, blast-furnace pitch, &c., which are too expensive in this country, and as they emit offensive odors and smoke makes their use prohibitive for domestic use, for which I claim my fuel particularly adapted, as it contains no pitch.

Many attempts and large amounts of money have been expended in this country to produce acceptable briquet fuel; but they have proven unsuccessful because the materials heretofore used have not produced briquets which are sufficiently hard, waterproof, cohesive, and of low first cost to make them commercial.

The ingredient in my composition which is particularly novel in an artificial fuel is petroleum-coke, which is produced as follows: Crude petroleum-oil is placed in a tank and allowed to settle, the sediment being known as "B. S." The liquid is separated from the B. S. and is distilled, which evaporates the the benzin, naphtha, ordinary white oil, &c. The mass remaining after distillation is called "tar" or "residuum." The said tar or residuum is subjected to distillation, when there is left what is called "wax-tailings." The liquid portion of the wax-tailings is removed and the remainder is known as "petroleum-coke," which is commercially a waste, having no sale, and therefore cheap. It contains a small percentage of sulfuric acid and cannot be melted without a flux, and for said flux I use a new product distilled from Texas oil known as "Texas asphalt." I may use rosin melted in fuel-oil with the distillate of Texas oil, or I may use the rosin alone as a flux.

In carrying out my invention I combine the ingredients in the following proportions, viz: petroleum-coke, five pounds; Texas asphalt or rosin, three and one-half pounds; glutinous matter, one and one-half pounds; water, ten pounds; coal-dust, eighty pounds. I heat three and one-half pounds of Texas asphalt or three and one-half pounds of rosin in one-half pound of fuel-oil and add thereto two and one-half pounds of petroleum-coke and at the same time stir the mixture. I then take ten pounds of water and mix it with one and one-half pounds of glutinous matter, heating the same to thickening-point, and add thereto the mixture of said Texas asphalt and coke or said rosin, producing thereby an emulsion. I then mix two and one-half pounds of dry pulverized petroleum-coke with eighty pounds of coal-dust or other base. Next the said emulsion is added to the mixture of coal-dust and coke, thoroughly incorporating the ingredients of the whole mass, which is then run through a press and molded into briquets, which are dried in an oven for thirty to fifty minutes at about 300° Fahrenheit, when they will be found to be hard, waterproof, and ready for use.

The valuable property of the petroleum-coke in my fuel is that it will not burn with ordinary heat, and thus sustain the briquets in their original shape without disintegration, even when forcibly stoked.

Having described my invention, I claim—

1. The herein-described artificial fuel, consisting of petroleum-coke, Texas asphalt, rosin, glutinous matter, water and coal-dust.

2. The herein-described artificial fuel, consisting of petroleum-coke, rosin, glutinous matter, water and coal-dust.

3. The herein-described artificial fuel, consisting of weight of five pounds of petroleum-coke, three and one-half pounds of Texas asphalt, one and one-half pounds of glutinous matter, ten pounds of water and eighty pounds of coal-dust.

4. The herein-described artificial fuel, consisting of petroleum-coke, glutinous matter, water and coal-dust.

Signed at New York, in the county of New York and State of New York, this 6th day of January, A. D. 1902.

CHARLES B. HARRIS. [L. S.]

Witnesses:
E. B. A. ZWOYER,
WILLIAM P. FRANCL.